ELECTROMECHANICAL ANALOG DIFFERENTIATING DEVICE

Filed April 26, 1957 5 Sheets-Sheet 1

INVENTOR
JAMES A. QUINN
BY Victor D. Borst
ATTORNEY

March 15, 1960 J. A. QUINN 2,928,602

ELECTROMECHANICAL ANALOG DIFFERENTIATING DEVICE

Filed April 26, 1957 5 Sheets-Sheet 3

INVENTOR
JAMES A. QUINN.
BY Victor D. Borst
ATTORNEY

March 15, 1960 J. A. QUINN 2,928,602

ELECTROMECHANICAL ANALOG DIFFERENTIATING DEVICE

Filed April 26, 1957 5 Sheets-Sheet 4

INVENTOR
JAMES A. QUINN
BY Victor D. Borst
ATTORNEY

ELECTROMECHANICAL ANALOG DIFFERENTIATING DEVICE

INVENTOR
James A. Quinn
BY
Victor D. Borst
ATTORNEY 2,928,602
Patented Mar. 15, 1960

2,928,602

ELECTROMECHANICAL ANALOG DIFFERENTIATING DEVICE

James A. Quinn, North Massapequa, N.Y., assignor to The Sperry Rand Corporation, Long Island City, N.Y., a corporation of Delaware Application April 26, 1957, Serial No. 655,327

6 Claims. (Cl. 235—183)

This invention relates to analog differentiating devices and more particularly to an improved electromechanical device for concurrently differentiating analog data in a plurality of individual channels.

As is generally known, conventional differentiating systems, as might be employed for navigational computation, normally incorporate individual devices, such as ball and disc integrators or rate generators, for each of the available channels of information. Such devices may burden airborne equipment with considerable weight when data in a plurality of informational channels has to be individually differentiated.

A principal object of this invention is to provide a small and light weight device for concurrently differentiating data from a plurality of informational channels.

In accordance with the present invention, equipment is provided to sample rapidly and periodically the analog voltages from individual informational channels. The successive voltage pulses from each channel successively displace a driving shaft component of shared equipment including a follow up servo loop through selectively engaged clutches. The output from the commonly shared equipment containing voltages equal to the difference in voltage levels between successive sampled voltage pulses from each individual informational channel is proportional to the time rate of change, or the differential, of the input data when the time duration of each voltage pulse is accurately controlled. Such output voltages from the shared equipment can be converted to read directly the desired differentials by applying an appropriate scale factor for the selected rate of cycling. As contemplated by the invention, switching means are provided in synchronism with the sampling means for unscrambling the multiplexed signals in the output of the shared equipment and for successively engaging magnetic clutches which displace the common driving shaft of the follow up servo loop. The analog data in each channel is differentiated by sharing, on a time basis, common equipment for converting the change in level of electrical signals into corresponding mechanical displacements of the driving shaft and employing the successive displacements of the shaft to generate electrical pulses which are directly proportional to the time rate of change of the data in each of the incoming channels. In one embodiment of the invention, the commonly displaced shaft is returned to its zero reference position between its successive displacements. In another embodiment of the invention, the effective utility of the common equipment is improved by providing periodic and selective means for rapidly zero referencing the driving shaft by a mechanical spring.

Other features and capabilities of the invention will be understood more clearly from the following detailed description taken in conjunction with the accompanying drawings in which:

Fig. 1 is a schematic diagram of equipment and circuits for practicing the invention;

Figs. 2*a* to 2*f* are diagrams for illustrating the cofunctioning of the components employed in Fig. 1;

Figure 1:
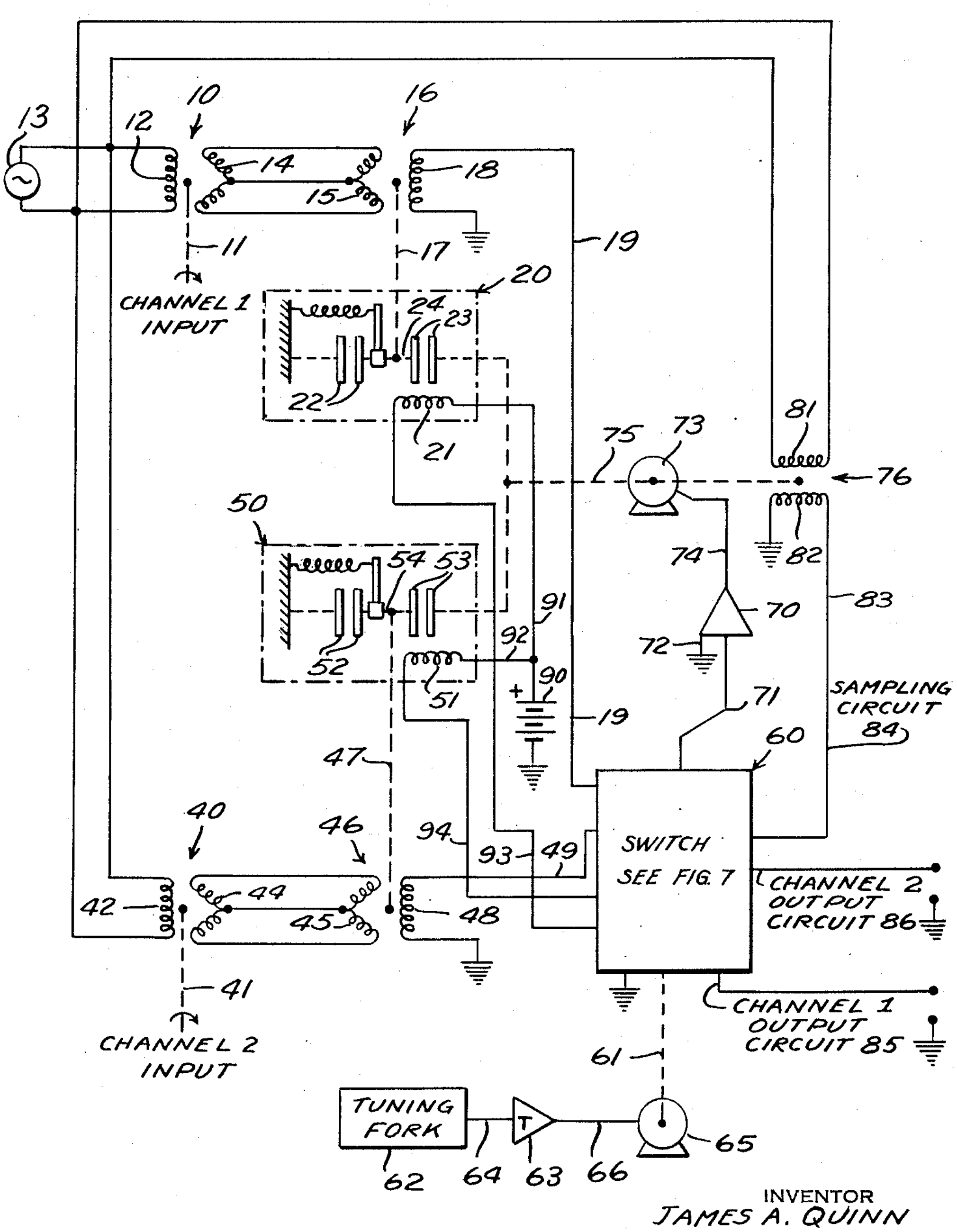
Figures 2A, 2B, 2C, 2D, 2E, 2F, 6A, 6B:
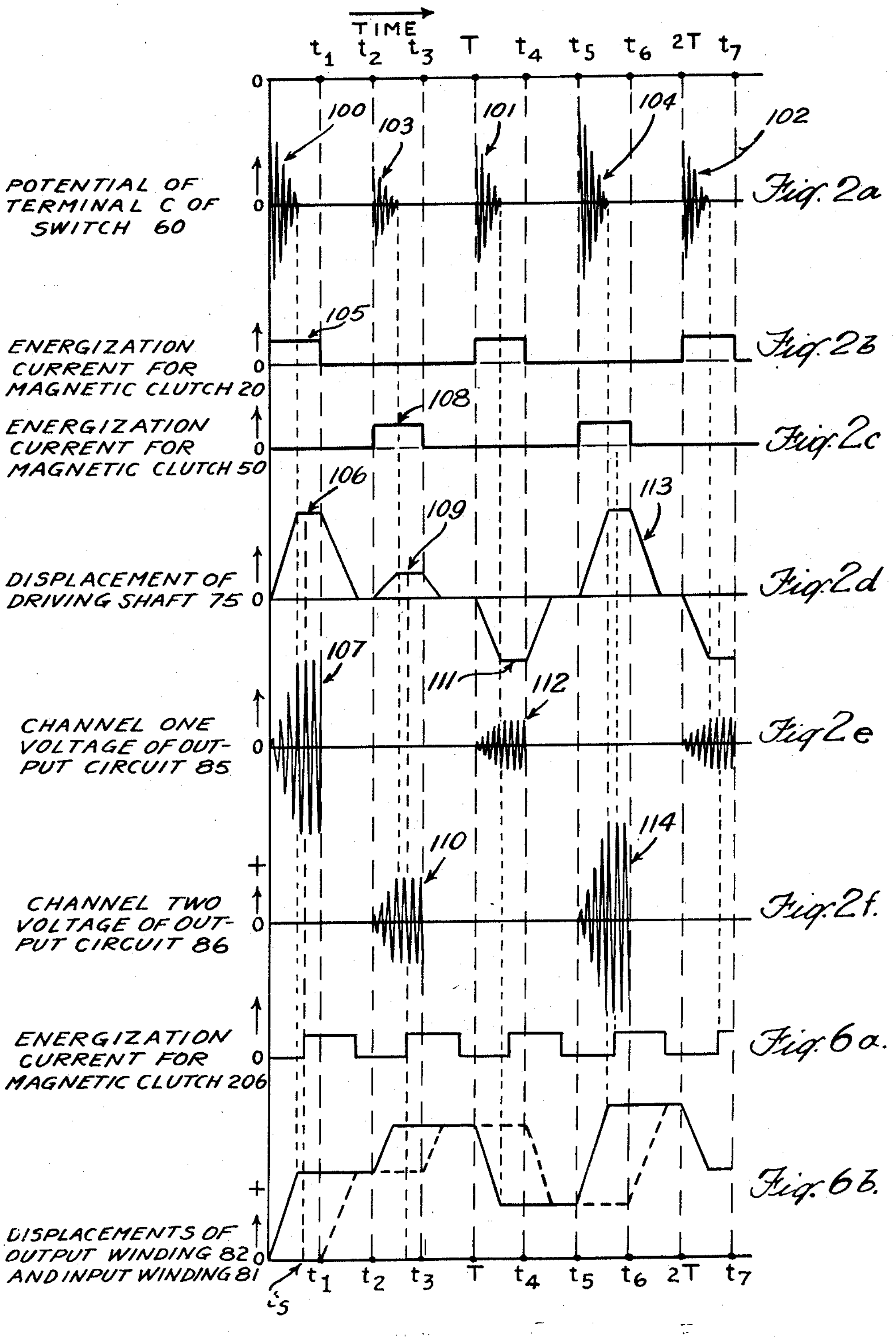
Figure 3:
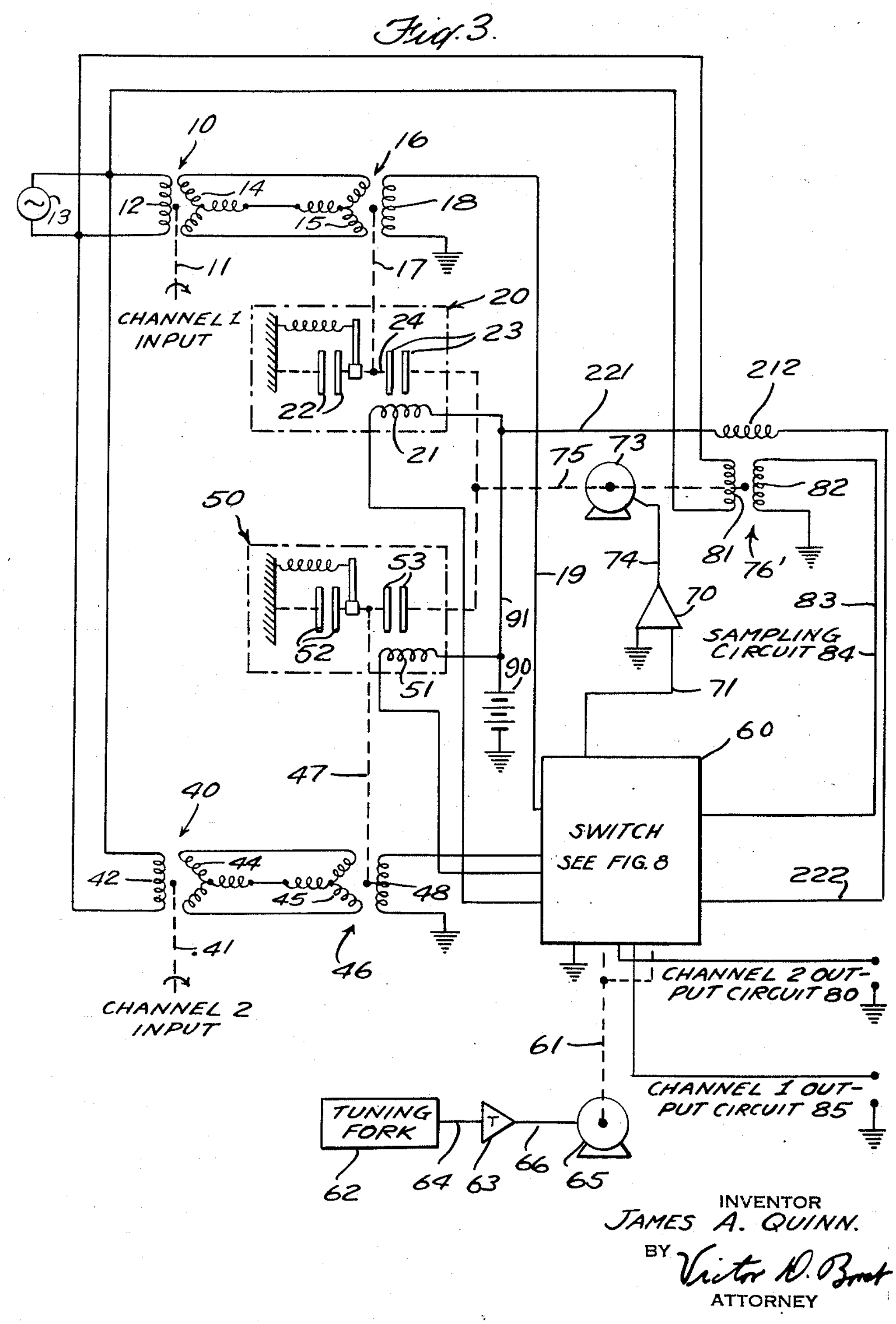
Fig. 3 is an improved modification of the embodiment shown in Fig. 1.
Figure 8:
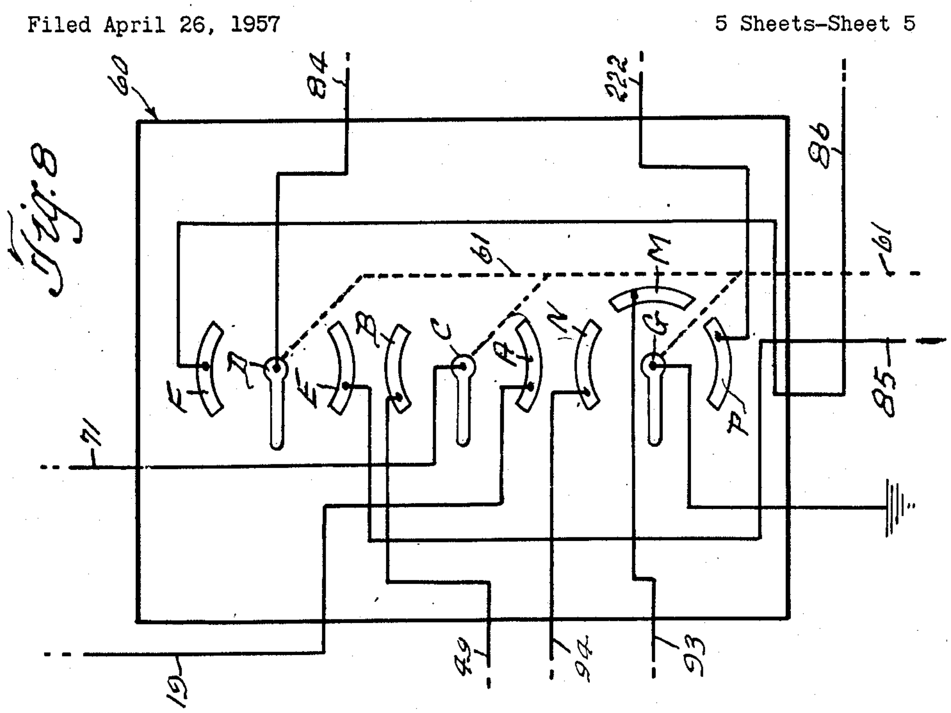
Figure 7:
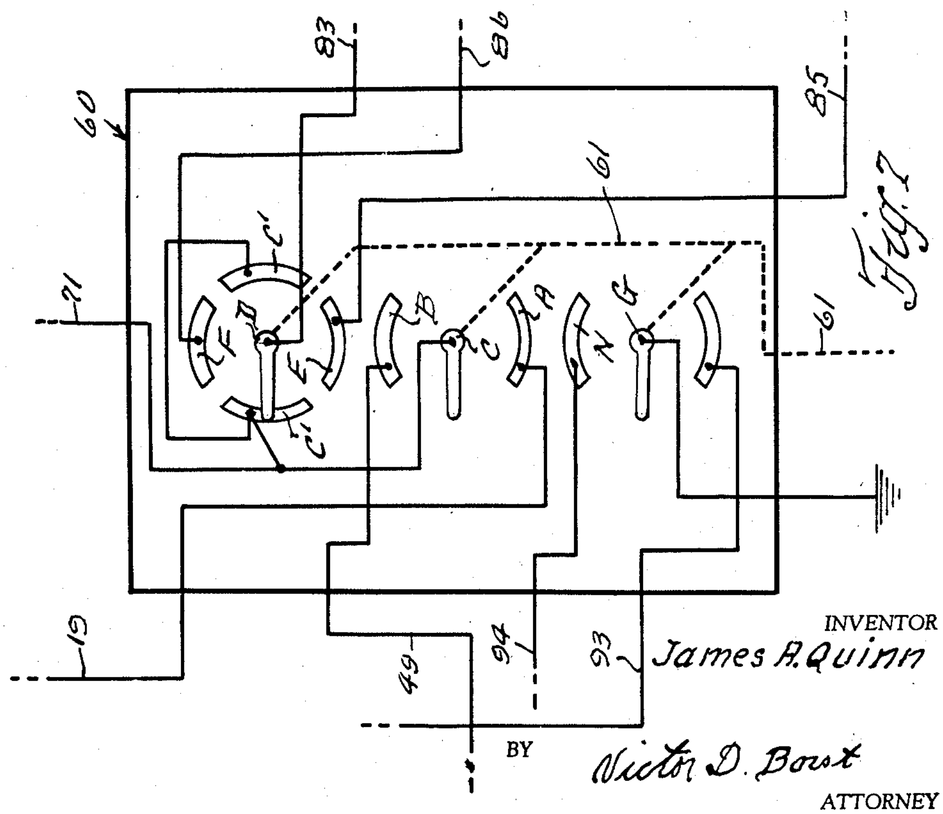

Figs. 6*a* and 6*b* are diagrams for illustrating the cofunctioning of the modified linear transformer as used in Fig. 3;

Fig. 7 is an enlarged detail view of the switching mechanism used in connection with the circuit shown in Fig. 1; and Fig. 8 is an enlarged detail view of the switching mechanism used in connection with the circuit shown in Fig. 3.

Referring to Fig. 1, the apparatus of the invention is illustrated as including transmitters 10 and 40 having their respective control shafts 11 and 41 continually displaced by devices (not shown) in accordance with available analog data from channels 1 and 2. The transmitter 10 has its input winding 12 connected across an A.C. source 13 and its three wire output winding 14 connected to the three wire input winding 15 of a control transformer 16 having a shaft 17 and an output winding 18, one side of the winding 18 being grounded. The transmitter 40 has its input winding 42 connected across the A.C. source 13 and its three wire output winding 44 connected to the three wire input winding 45 of a control transformer 46 having a shaft 47 and an output winding 48, one side of the winding 48 being grounded.

The other sides of output windings 18 and 48 are connected to terminals A and B of a switch 60 by conductors 19 and 49, respectively. The switch 60 is a motor driven cam or slip ring type of switch having a control shaft 61 and its multiswitching functions will be explained later in conjunction with Figs. 2*a* to 2*f*.

The driving of the control shaft 61 of the switch 60 is accurately controlled by a precision type of tuning fork 62 driving an amplifier 63 through a cable 64 connected therebetween. A timing motor 65 is connected to the output side of the amplifier 63 by a cable 66 and its shaft is operatively connected to drive the control shaft 61 of the switch 60.

A servo amplifier 70 is connected at its input side across a terminal C of the switch 60 and ground by conductors 71 and 72, respectively, the terminal C being successively connected to the terminals A and B by the internal wiring of the switch 60. The output side of the servo amplifier 70 is connected to a servomotor 73 by a cable 74, the shaft of the servomotor being connected to displace a driving shaft 75 for driving a controlling shaft of a linear transformer 76 which has a transformation ratio permitting its output to vary linearly with its mechanical input.

Magnetic clutches 20 and 50 are operatively connected between the driving shaft 75 and the shafts of the control transformers 16 and 46, respectively. The clutch 20 comprises a solenoid coil 21 and a spring loaded engaged pair of plates 22 serially interconnected with a pair of normally disengaged plates 23 by a shaft 24. One of the input clutch shafts associated with the plates 23 is connected to the driving shaft 75, the shaft 24 is connected to the shaft 17 of the control transformer 16 and the other shaft of the clutch 20 is fixed to a stationary frame of the equipment. Magnetic clutch 50 is similar to the clutch 20 and comprises a solenoid coil 51, a spring loaded pair of engaged plates 52, a normally disengaged pair of plates 53, and a shaft 54 connected to one plate of each pair of plates 52 and 53 as well as to the shaft 47 of the control transformer 46, the other plate of pair of plates 53 being connected to the driving shaft 75.

Linear transformer 76 has an input winding 81 connected across the A.C. source 13 and an output winding 82, one side of winding 82 being grounded. A conductor 83 of a sampling circuit 84 is connected between the ungrounded side of the winding 82 and a terminal D of the switch 60, the terminal D being successively connected to a terminal E, a terminal C′ connected to the terminal C, a terminal F, and the terminal C by the internal wiring of the switch 60. An ungrounded conductor of a grounded channel 1 output circuit 85 is connected to the terminal E and an ungrounded conductor of a grounded channel 2 output circuit 86 is connected to the terminal F.

One end of the solenoid coils 21 and 51 of the magnetic clutches 20 and 50 are connected to a positive side of a D.C. source 90 by conductors 91 and 92, respectively, the other side of the source 90 being grounded. The other sides of the solenoid coils 21 and 51 are connected to terminals M and N of the switch 60 by conductors 93 and 94, respectively. Another terminal G of the switch 60 is grounded and the internal wiring of the switch provides for successive connections between the terminal G to M and G to N.

The switching functions performed by the switch 60 for effecting the differentiation of the analog data in channels 1 and 2 will be explained in conjunction with the diagrams of Figs. 2*a* to 2*f* in which 0 to T and T to 2T represent two successive cycles of the switch 60. In Fig. 2*a* is shown the voltage variations of the terminal C as the switch 60 samples voltages from the control transformer 16 through the terminal A during time intervals 0 to $t_1$, T to $t_4$, and 2T to $t_7$, the voltage variations being represented by curves 100, 101 and 102, respectively. Also Fig. 2*a* shows the voltage variations of the terminal C as the switch 60 samples voltages from the control transformer 46 through terminal B during time intervals $t_2$ to $t_3$ and $t_5$ to $t_6$, the voltage variations being represented by curves 103 and 104, respectively. It is assumed that the channel 1 and 2 inputs prior to time 0 is zero.

In Figs. 2*b*, 2*c*, 2*d*, 2*e* and 2*f* are shown the energization current for the magnetic clutch 20, the energization current for the magnetic clutch 50, the displacements of the driving shaft 75, the output voltage pulses in channel 1 output circuit 85, and the output voltage pulse in channel 2 output circuit 86, respectively.

During time interval 0 to $t_1$, plates 23 of the clutch 20 are engaged by the energization current at level 105, plates 53 of the clutch 50 are disengaged, the driving shaft 75 is displaced from zero to level 106 by the servo loop comprising the control trnasformer 16, the contacts A and C of the switch 60, the servo amplifier 70 and the servomotor 73. As a result the linear transformer 76 is driven to yield an output through the terminals D and E to the circuit 85 as shown by the curve 107.

During the time interval $t_1$ to $t_2$, the terminal C is disconnected from the terminal A, the plates 23 are disengaged, the plates 22 are engaged to hold the displacement of the winding 18 of the control transformer 16 at level 106, the terminal D is connected to the terminal C through the terminal C′ and the servo loop comprising the linear transformer 76, the servo amplifier 70 and the servomotor 73 drives the shaft 75 from the level 106 to its zero reference position.

During time interval $t_2$ to $t_3$, plates 53 of the clutch 50 are engaged by the energization current at level 108, the plates 23 of the clutch 20 remain disengaged the driving shaft 75 is displaced from zero to the level 109, and the linear transformer 76 is driven to yield an output through the terminals D and F to the circuit 86 as shown by the curve 110.

During the time interval $t_3$ to T, the terminal C is disconnected from the terminal B, the plates 53 are disengaged, the plates 52 are engaged to hold the displacement of the winding 48 of the control transformer 46 at level 109, the terminal D is connected to the terminal C and the servo loop drives the shaft 75 from the level 109 to its zero reference position.

During the time interval T to $t_4$, the plates 23 of the clutch 20 are engaged by the energization current at level 105, the plates 53 of the clutch 50 remain disengaged and the driving shaft 75 is displaced from zero to a negative level 111 as a consequence of the fact that the output coil 18 has been held by the clutch plates 22 at a level corresponding to the amplitude of the curve 100 and the input signal from channel 1 has decreased in amplitude during time interval $t_1$ to T. As a result, the linear transformer 76 is driven in a reverse direction to yield an output through the terminals D and E to the circuit 85 as shown by curve 112, the amplitude of the curve 111 being proportional to the difference between the amplitudes of curves 101 and 100 and the phase of curve 112 being 180° different from the phase of the curve 107 to represent a negative differential.

During time interval $t_4$ to $t_5$, the terminal C is disconnected from the terminal A, the plates 23 are disengaged, the plates 22 are engaged to fix the displacement of the winding 18 of the control transformer 16 at level 111, the terminal D is connected to the terminal C and the servo loop drives the shaft 75 from the level 111 to its zero reference position.

During time interval $t_5$ to $t_6$, plates 53 of the clutch 50 are engaged and the driving shaft 75 is displaced from zero to a positive level 113 corresponding to the difference in amplitude levels between curves 104 and 103, as a consequence of the fact that the displacement of the output winding 48 of the control transformer 46 has been held at level 109 by the clutch plates 52 during the time interval $t_3$ to $t_5$. As a result, the linear transformer 76 is driven to yield an output through the terminals D and F to the circuit 86 as shown by curve 114, the amplitude of the curve 114 being proportional to the difference between the amplitude of curves 104 and 103 and the phase difference between curves 114 and 110 being zero to represent a positive differential.

During time interval $t_6$ to $t_2$, the operations of the time interval $t_3$ to T are repeated and the output coil 48 of the control transformer 46 is held at the displacement level of 113.

During the time interval 2T to $t_7$, the output yielded to channel 1 output circuit 85 as represented by a curve 115 is zero due to the no change in amplitude between the curves 102 and 101.

From the foregoing, it can be seen that the pulses 107, 112 and 115 in output circuit 85 and pulses 110 and 114 can represent the differentials with respect to time of the input data in channels 1 and 2, respectively, when an appropriate scaling factor is applied for the cycling rate of the switch 60.

For embodiment of the invention as shown in Fig. 1, it will be noted from the analysis of Figs. 2*a* to 2*f* that the tuning fork 62, the timing amplifier 63, the timing motor 65, the linear transformer 76, the servo amplifier 70 and the servomotor 73 are time shared for the differentiating operations of the data in channels 1 and 2. However, during approximately one-half of each differentiating cycle, such as the time intervals $t_1$ to $t_2$ and $t_3$ to T of the first cycle, none of the equipment is gainfully employed as the shaft 75 is driven back to its reference zero position in preparation for the next active portion of the sampling cycle.

The effective utilization of equipment is improved in the embodiment of the invention which is shown in Fig. 3. Generally the same components and connections as used as shown in Fig. 1 with the principal difference that a new and novel linear transformer 76′ is substituted for the linear transformer 76. Also, the switch 60 is modified to add a new switching operation for the new linear transformer 76′ and to omit the switching operation of connecting the terminal D to the terminal C.

Figure 4:
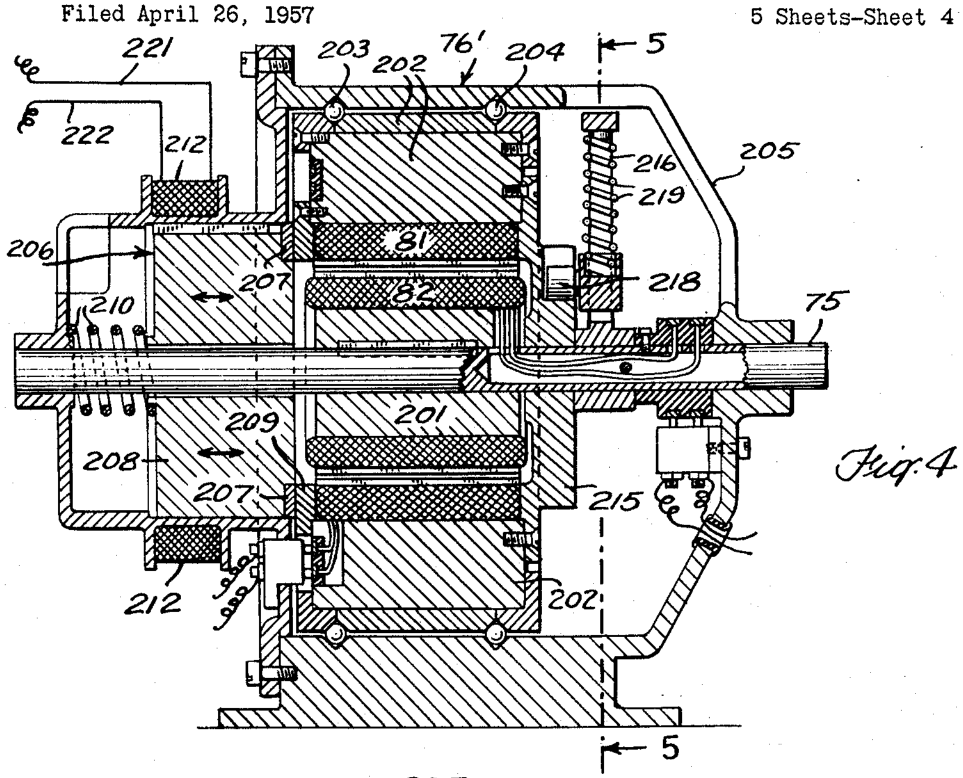
Fig. 4 is a cross sectional view of a modified linear transformer as used in Fig. 3.

In Fig. 4, the linear transformer 76′ includes the output winding 82 disposed upon a core structure 201 which is mounted on the shaft 75 and the input winding 81 disposed upon a cylindrical core structure 202 which is mounted on the ball bearings being secured to a stationary frame 205 of the linear transformer 76′. A spring-loaded magnetic clutch 206 is disposed between the frame 205 and the core structure 202. The magnetic clutch 206 has a clutch plate 207 mounted on a magnetic core structure 208, the clutch plate 207 being forced against a clutch plate 209 which is mounted on the core structure 202. Clutch plates 207 and 209 are held in engagement by a spring 210 disposed in compression between the frame 205 and the magnetic core structure 208. A solenoid coil 212 is disposed on the frame 205 and is designed to disengage the clutch plates 207 and 209 when the coil is energized from a D.C. source such as the source 90.

Figure 5:
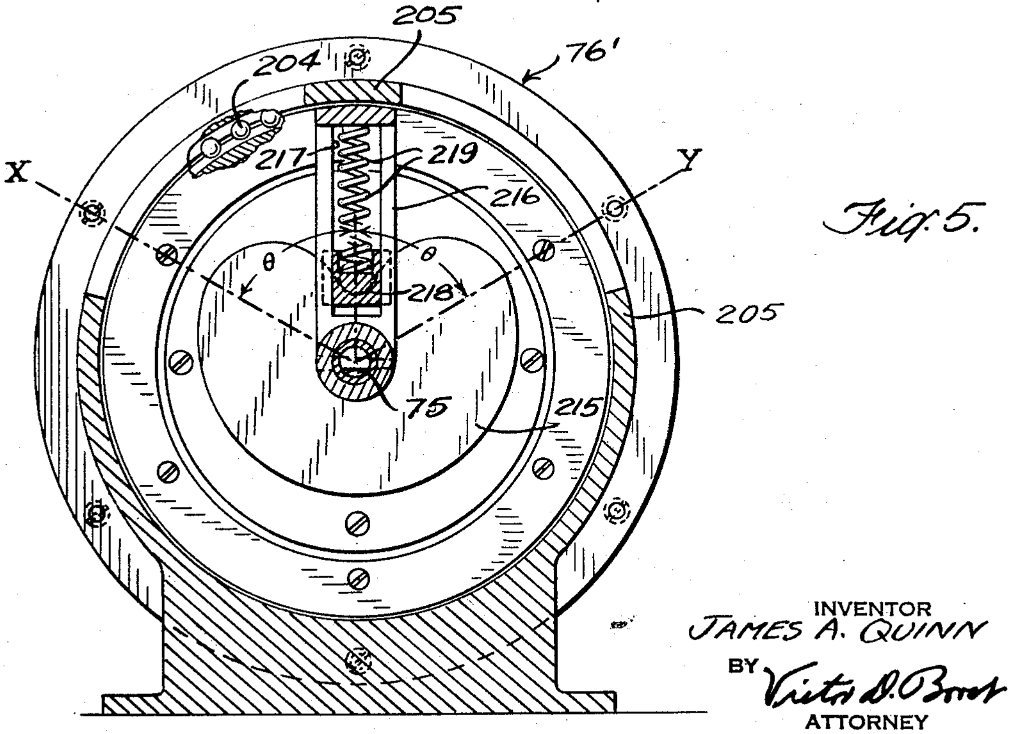
Fig. 5 is an elevation sectional view of Fig. 4 showing a spring loaded heart-shaped cam mechanism.

A heart-shaped cam 215, such as shown in Fig. 5, is mounted on the core structure 202 and a member 216 having a radial slot 217 is mounted on the shaft 75. The radial slot 217 guides a cam follower 218 disposed in the radial slot 217 and a spring 219 in compression between the end of the member 216 and the cam follower 218 maintains the cam follower in forced contact with the surface of the cam 215. With selected components, any displacement of the shaft 75 between zero and the angular position O of the maximum radii OX and OY of the cam 215 can effect a subsequent and similar displacement of the core structure 202 and the input coil 81. Such a follow-up displacement for the input coil 81 requires that the shaft 75 be held stationary before the solenoid coil 212 is energized.

In Fig. 3, the solenoid coil 212 of the linear transformer 76′ is connected to the ungrounded side of the source 90 by a conductor 221 and to a terminal P on the switch 60 by a conductor 222, the terminal P being periodically connected to the grounded terminal G by the internal wiring of the switch for selectively energizing the solenoid coil 212 and, thereby, disengaging the clutch plates 207 and 209. The operational functions of the switch 25 which is associated with the terminal P is shown in the diagram of Fig. 6*a* as a curve 300 for the cycling of energization current to the magnetic clutch 206. Switch 60 is normally designed to provide an internal connection between the terminals C and A for the entire time interval 0 to $t_1$. At a time instant $t_s$ prior to instant $t_1$ but after the shaft 75 has reached its displacement level 106, the terminal P is connected to the terminal G for the time interval $t_s$ to $t_1$. As shown by a curve 301 in Fig. 6*b*, the output winding 82 of the linear transformer 76′ is displaced to level 106 during the time interval 0 to $t_s$ while the input coil 81 is held stationary by the spring-loaded magnetic clutch 206. In the time interval $t_s$ to $t_1$, the heart-shaped cam 215 and associated components thereto effect a follow-up displacement of the input coil 81, as shown by a curve 302, to displacement level 106 when the magnetic clutch 206 is energized by the current as represented by the curve 30 in Fig. 6*a*. Similar follow-up displacements of the input coil 81 to the output coil 82 occur near time instances $t_3$, $t_4$, $t_6$ and $t_7$ as shown in Figs. 6*b*. As a consequence of the very rapid displacement actions obtainable by spring-actuated devices in comparison to the time required for stabilizing servo loop operations, it will be apparent to those skilled in the art that the time interval during which equipment is not effectively usable for each cycle is reduced from time interval $t_1$ to $t_2$ for the embodiment shown in Fig. 1 to time interval $t_s$ to $t_1$ for the embodiment shown in Fig. 3. Hence, the common equipment shown in Fig. 3 can process more input channels of information than similar common equipment as shown in Fig. 1.

It is to be understood that various modifications of the invention other than those above described may be effected by persons skilled in the art without departing from the principle and scope of the invention as defined in the appended claims.

What is claimed is:

1. An analog differentiating device comprising a plurality of transmitters having shafts settable in accordance with available data, a plurality of control transformers one of which is connected to each of said transmitters, a driving shaft, a plurality of clutches one of which is connected between the shaft of each of said control transformers and said driving shaft, means connected to said driving shaft for successively displacing the said driving shaft in accordance with the magnitude of successive pulses of A.C. signals, switching means disposed between the output side of each of the said control transformers and the said displacing means for selectively connecting said displacing means to one of each of the said control transformers during a discrete interval of time, and for selectively engaging one of the said clutches for substantially the same discrete interval of time and disengaging said one of said clutches subsequent to the said discrete interval of time, a linear transformer having its shaft operatively connected to and driven by the said driving shaft, an A.C. source connected across the input sides of said transmitters and said linear transformer, a plurality of output circuits, means included in said switching means operative to selectively connect one of said plurality of output circuits to the said linear transformer during said discrete interval of time and means included in said switching means operative to connect automatically and successively the said displacing means to each of the other of the said control transformers and to successively connect the said linear transformer to each of the other of the said output circuits and constant drive means connected to said switching means for establishing the desired uniformity of said discrete time intervals.

2. An analog differentiating device as claimed in claim 1 wherein said displacing means includes a servo amplifier connected at its input side to the said switching means, a servomotor connected to said servo amplifier, the shaft of said servomotor being connected to the said driving shaft, and means included in said switching means operative to connect the said servo amplifier at its input side to the said linear transformer subsequent to said discrete interval of time.

3. An analog differentiating device as claimed in claim 2 wherein the automatic switching means includes a timing A.C. source, a timing motor connected across said timing A.C. source, and means operatively controlling said switching means and said engaging means by said timing motor.

4. An analog differentiating device as claimed in claim 1 wherein said linear transformer has a rotatable stator and there is provided clutching means for immobilizing said stator during said discrete interval of time and releasing said stator subsequent to said discrete interval of time, and means connected between the shaft and stator of said linear transformer for providing a torque resisting displacements therebetween.

5. An analog differentiating device as claimed in claim 4 wherein said resisting torque means includes a heart-shaped cam fixed to said stator, a member fixed to the shaft of said linear transformer and having a slot extending in a radial slot of said member, a spring, and means disposing said spring between said cam follower and said member for urging said cam follower against said cam.

6. An analog differentiating device as claimed in claim 5 wherein there is provided a timing A.C. source, a timing motor connected across said timing A.C. source and means operatively controlling said switching means, said engaging means and said clutching means by said timing motor.

References Cited in the file of this patent

UNITED STATES PATENTS 2,645,755 Garfield ---------------- July 14, 1953

2,674,707 De Mott ---------------- Apr. 6, 1954
2,713,135 Macklem ---------------- July 12, 1955

OTHER REFERENCES

Electronic Analog Computers (Korn and Korn), 1952, McGraw-Hill Book Company, Inc., New York. Page 235 relied on.